US008812366B2

(12) United States Patent
Folk et al.

(10) Patent No.: US 8,812,366 B2
(45) Date of Patent: Aug. 19, 2014

(54) AUTOMATIC GENERATION OF CHANGE ORDERS

(75) Inventors: Amy Baker Folk, Charlotte, NC (US); Shane Anthony Johnson, Charlotte, NC (US); William Thomas Sanders, Denver, NC (US); Daniel Christopher Bohen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 12/277,966

(22) Filed: Nov. 25, 2008

(65) Prior Publication Data
US 2010/0082443 A1    Apr. 1, 2010

Related U.S. Application Data

(63) Continuation-in-part of application No. 12/241,401, filed on Sep. 30, 2008, now abandoned.

(51) Int. Cl.
| | |
|---|---|
| *G06Q 20/00* | (2012.01) |
| *G06Q 40/00* | (2012.01) |
| *G06Q 20/20* | (2012.01) |
| *G07F 19/00* | (2006.01) |

(52) U.S. Cl.
CPC .............. *G06Q 20/20* (2013.01); *G07F 19/00* (2013.01)
USPC ........................................... 705/16; 235/379

(58) Field of Classification Search
None
See application file for complete search history.

(56) References Cited

U.S. PATENT DOCUMENTS

| | | | | |
|---|---|---|---|---|
| 6,540,136 | B1 * | 4/2003 | Ross | 235/379 |
| 6,550,671 | B1 * | 4/2003 | Brown et al. | 235/379 |
| 6,772,941 | B1 * | 8/2004 | Carter | 235/7 R |
| 6,843,412 | B1 * | 1/2005 | Sanford | 235/379 |
| 6,848,612 | B2 | 2/2005 | Uematsu et al. | |
| 6,981,633 | B2 * | 1/2006 | Inoue et al. | 235/7 R |
| 6,983,836 | B2 | 1/2006 | Adams et al. | |

(Continued)

FOREIGN PATENT DOCUMENTS

| | | | | |
|---|---|---|---|---|
| EP | 1486923 | 12/2004 | | |
| JP | 2003263682 | * 9/2003 | | G07G 1/12 |
| WO | 2005038623 | 4/2005 | | |

OTHER PUBLICATIONS

Non-Final Office Action for related U.S. Appl. No. 12/241,401 mailed Mar. 9, 2011.

(Continued)

*Primary Examiner* — Ryan Zeender
*Assistant Examiner* — Denisse Ortiz Roman
(74) *Attorney, Agent, or Firm* — Banner & Witcoff, Ltd.; Michael A. Springs

(57) ABSTRACT

A method for automatically generating change orders may be performed at a point of sale system. The point of sale system may determine an amount of funds in the point of sale system and whether additional funds are necessary. If so, a change order may be automatically requested from a back office system (e.g., a cash recycler) or a financial institution. The back office system may determine whether it is able to fulfill the change order request and if not, forward the request to the financial institution. In one or more arrangements, a notification that a change order request has been received may be transmitted to a manager or other change order personnel. The change order request and funds delivered to the point of sale system in response thereto may be reconciled with the back office system.

12 Claims, 17 Drawing Sheets

(56) References Cited

U.S. PATENT DOCUMENTS

| | | | |
|---|---|---|---|
| 7,340,415 | B1 | 3/2008 | Gasper et al. |
| 2001/0020638 | A1 | 9/2001 | Uematsu et al. |
| 2001/0054643 | A1 | 12/2001 | Siemens |
| 2002/0120572 | A1 | 8/2002 | Bellucci et al. |
| 2003/0033250 | A1 | 2/2003 | Mayes et al. |
| 2003/0033251 | A1 | 2/2003 | Sherlock |
| 2003/0083969 | A1 | 5/2003 | Uchiyama et al. |
| 2003/0205619 | A1* | 11/2003 | Terranova et al. ............ 235/381 |
| 2004/0215566 | A1 | 10/2004 | Meurer |
| 2004/0249718 | A1 | 12/2004 | Kuroda et al. |
| 2005/0080731 | A1 | 4/2005 | Snyaneshwar |
| 2005/0108164 | A1 | 5/2005 | Salafia et al. |
| 2005/0289051 | A1 | 12/2005 | Allin et al. |
| 2006/0022032 | A1 | 2/2006 | Fillinger et al. |
| 2007/0045395 | A1 | 3/2007 | Corona et al. |
| 2007/0063016 | A1 | 3/2007 | Myatt et al. |
| 2007/0122023 | A1 | 5/2007 | Jenrick et al. |
| 2007/0151827 | A1* | 7/2007 | Brandstrom et al. ......... 194/206 |
| 2009/0083182 | A1 | 3/2009 | Coventry et al. |

OTHER PUBLICATIONS

Final Office Action for U.S. Appl. No. 12/241,401, mailed May 24, 2010.

Non-final Office Action for U.S. Appl. No. 12/241,401, mailed Sep. 15, 2010.

U.S. office action for U.S. Appl. No. 12/241,401 mailed Apr. 11, 2012.

Office action for related U.S. Appl. No. 12/241,401 mailed Dec. 12, 2012.

U.S. Office Action for U.S. Appl. No. 12/241,401 mailed Sep. 2, 2011.

Final Office Action mailed Jun. 18, 2013, in connection with U.S. Appl. No. 12/241,401.

International Search Report and Written Opinion for International Application No. PCT/US2007/088650 mailed Sep. 16, 2008, 10 pages.

International Search Report and Written Opinion of the International Searching Authority for International Application No. PCT/US09/58743, mailed Mar. 31, 2010, 8 pages.

* cited by examiner

AUTOMATIC GENERATION OF CHANGE ORDERS

CROSS-REFERENCE TO RELATED APPLICATIONS

The present application is a continuation-in-part of co-pending application Ser. No. 12/241,401, entitled "AUTOMATIC GENERATION OF CHANGE ORDERS," and filed on Sep. 30, 2008, the content of which is incorporated herein by reference in its entirety.

BACKGROUND

Businesses and other organizations often require a supply of cash to fund transactions such as providing change for customer purchases. In some instances, such businesses and organizations use a cash handling device to provide an accessible cash supply. Occasionally, the supply of cash (e.g., specific denominations of currency) must be replenished. Typically, to replenish the supply of cash, a business will have to monitor a cash handling device and manually submit a request for more cash (i.e., a change order) to a financial institution.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to some aspects, a process of automatically generating a change order may be performed. A cash handling device may determine an amount of currency available at the device. The cash handling device then may determine whether there is a shortage of currency of one or more denominations. If there is a shortage of currency, the cash handling device may automatically generate a change order to request additional currency from a financial institution. The request for additional funds may trigger debiting of one or more accounts of a user or entity associated with the financial institution. The cash handling device may subsequently receive the requested currency.

According to another aspect, a change order may be automatically generated at a point of sale system. The point of sale system may be in data communication with a back office system such as a cash handling device. The back office system may determine whether it is able to fulfill the change order and if so, place the order in a "pending delivery to POS" queue. A cashier or other employee may then login to the back office system and select the change order from the queue, at which point the appropriate funds would be dispensed and debited to the cashier's drawer. Alternately, the change order may be directed to a manager's queue, which may contain pending change orders for multiple cashiers and/or cash registers. At the managers's option all change orders may be dispensed sequentially with individual receipts, or change orders may be selected and dispensed individually. In either case, the manager would be performing the transaction on behalf of the cashier or register and cashier/register balance would be debited appropriately Proxy transactions and delegation of transaction capabilities is described in U.S. application Ser. No. 12/323,001, entitled "PROXY TRANSACTIONS AND DELEGATION OF TRANSACTION CAPABILITIES AND ROLES," and filed Nov. 25, 2008, now U.S. Pat. No. 8,214,257, issued Jul. 3, 2012, the content of which is incorporated herein by reference in its entirety. Optionally, a notification may be transmitted to a mobile device associated with a manager or other personnel. If the back office system is not able to fulfill the change order, the back office system may forward the change order to a financial institution. Once the funds have been received at the point of sale system, the change order and funds may be reconciled.

In one or more configurations, the cash handling device may not only determine whether there is currently a shortage of currency of one or more particular denominations, but also whether there is a predicted shortage of currency of one or more particular denominations. Determining whether there is a predicted shortage of currency of one or more denominations may involve analyzing historical usage data, producing a linear or other regression and/or trend line, and comparing the linear or other regression and/or trend line to local usage data. Other data that may be used in predicting needs may include intervals between carrier runs if a predefined schedule exists or a frequency limit of replenishment in view of transportation costs.

In one or more configurations, automatically generating a change order may further include reconciling the change order. For example, the actual funds received may be reconciled against the amount of funds requested or amount of funds the financial institution provided for transport to the client.

According to one or more additional aspects, a method of processing an automatically generated change order may be performed. A bank computer may receive an automatically-generated change order for an amount of currency. The bank computer may then acknowledge receipt of the automatically-generated change order, and it may also verify debiting information contained therein. The bank computer may subsequently debit an account based on the debiting information and schedule delivery of the ordered currency.

According to another aspect, during processing of a change order where funds are physically delivered from a financial institution to the requesting entity, the funds might not be debited from the entity's account during transit. Instead, the funds remain credited in the entity's account until the funds are received at the entity and reconciled/confirmed with the financial institution.

According to yet another aspect, shortages or overages of currency may be defined based on a maximum level, a minimum level and a target level. A target level defines a preferred level of currency to have in a currency handling device for a specified period. A maximum level refers to a level of funds where funds are likely to exceed the needs of the entity or a capacity of the physical storage component. In some instances, the maximum level may be defined based on a risk of theft (i.e., the greater the amount of funds in the machine, the greater risk of theft). A minimum level generally refers to a level of funds where funds are likely to run out over the specified period of time. The maximum and minimum levels, in one or more arrangements, may be defined based on the target level. The target level may be defined based on predictions of cash usage needs. The predictions may be formed based on historical usage, known events, user input and the like. Using the predictions, the target level may be modified in accordance therewith. The target levels may be modified automatically, remotely, manually or a combination thereof (e.g., recommendation automatically generated and manually confirmed/accepted).

According to another aspect, recommendations or advice may be presented to a user for confirmation. If the user or client does not agree with the target level, the client may request that the target level be changed since the target level may be controlled by the financial institution. For example, the client may issue a change request to the financial institution to alter the target level. Alternatively, a change order, target level modification or transport request may be provided to the user for confirmation and modification, if desired. The user may choose to accept or reject the recommendations and to modify one or more attributes such as amount of funds requested, time of transport, a maximum level and the like.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), depository machines, currency recyclers and the like. Currency recyclers generally refer to cash handling devices that are configured to dispense the same currency that was earlier deposited. For example, if a user deposits a five-dollar bill into a cash recycler machine, the same five-dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
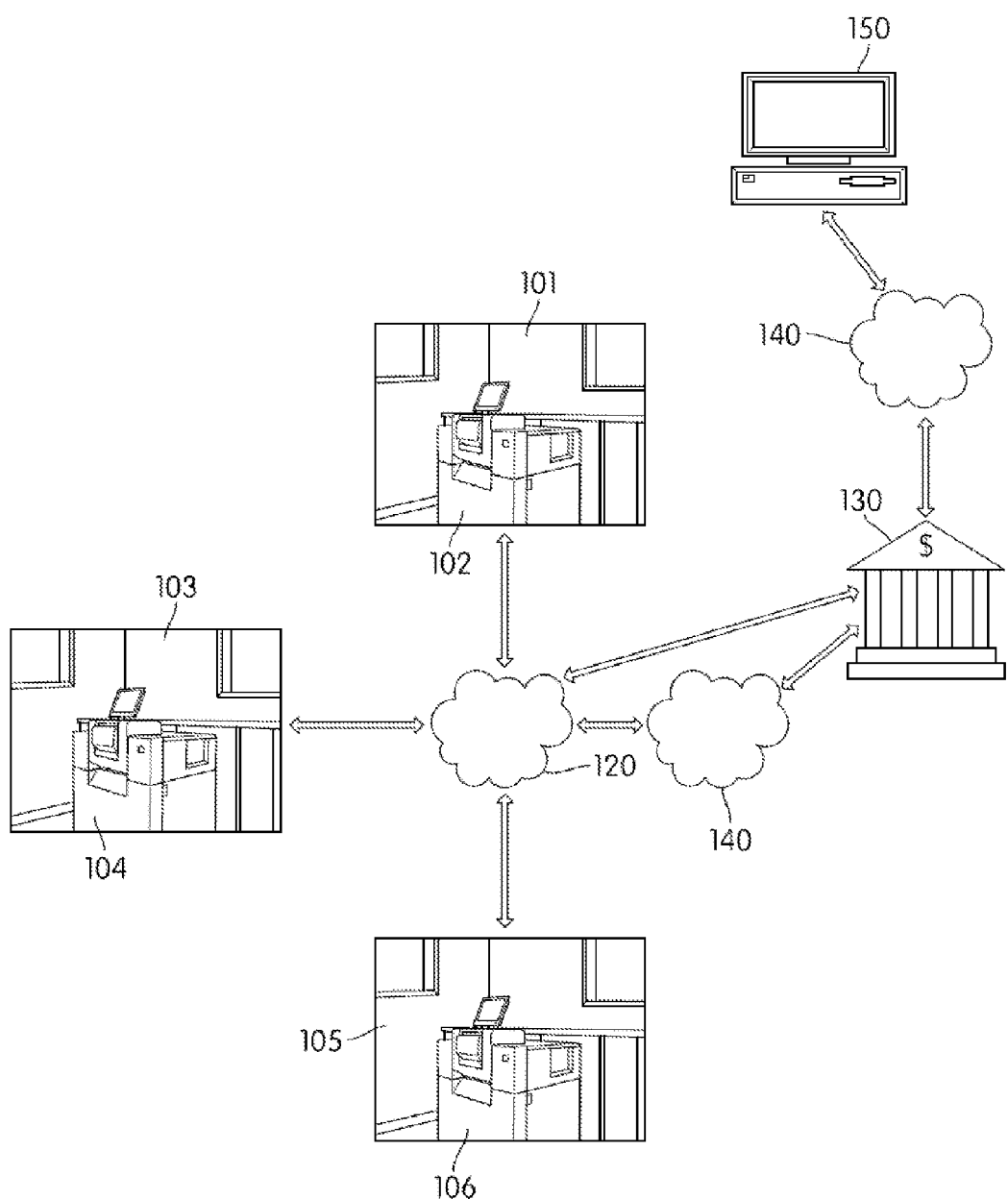
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Figure 2:
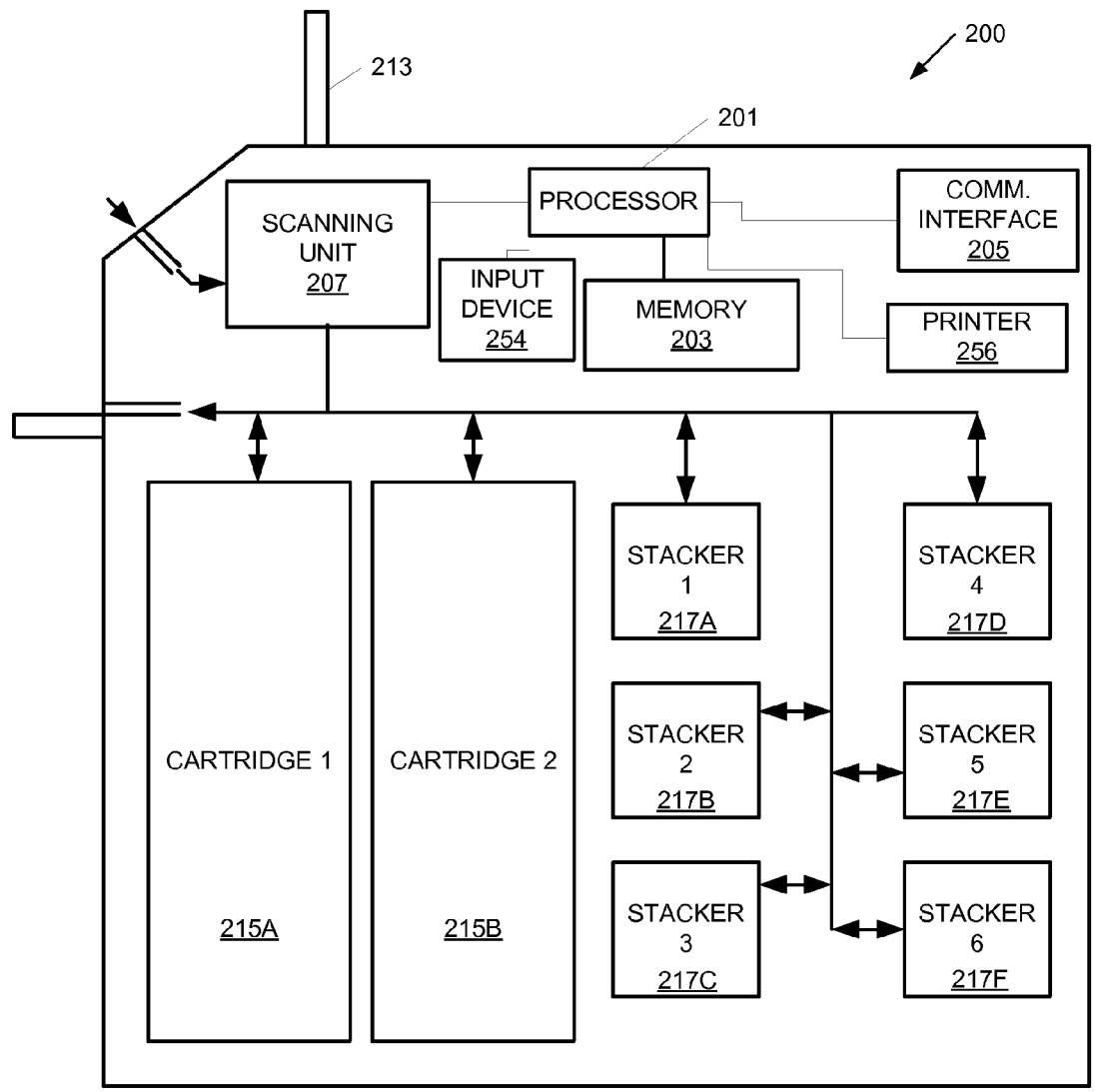
FIG. 2 illustrates a simplified diagram of a cash recycler that may be used in accordance with the operating environment of FIG. 1.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and stackers 217 or rolled stored modules (RSMs). Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or more printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport. In some configurations, RSMs (not shown) may be used instead of or in addition to stackers 217.

Scanning unit 207 may be configured to scan each bill or currency that is inserted into recycler 200. Scanning unit 207 may be configured to detect defects, unauthorized currency reproductions, denomination, type of currency (e.g., which country the currency originates from) and the like. Scanning unit 207 may further be configured to refuse money (either through input slot 209 or withdrawal slot 211) if it cannot be properly recognized or if the currency is deemed to be an unauthorized currency reproduction. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
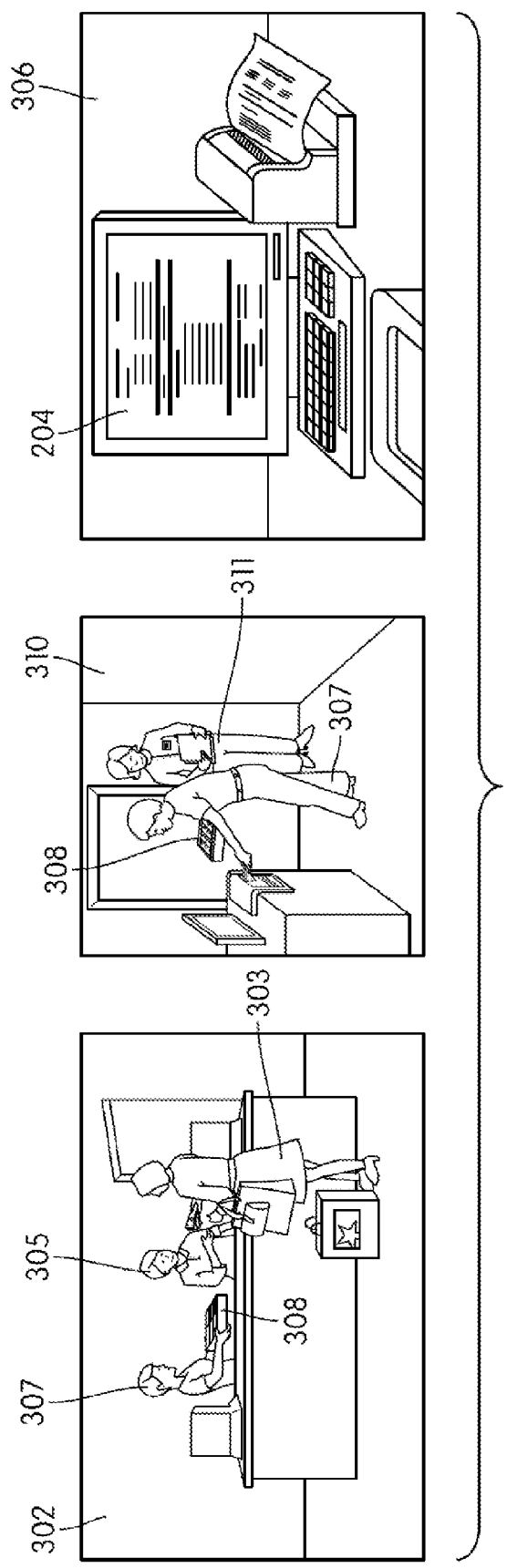
FIG. 3 illustrates various features of cash recyclers used in various aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
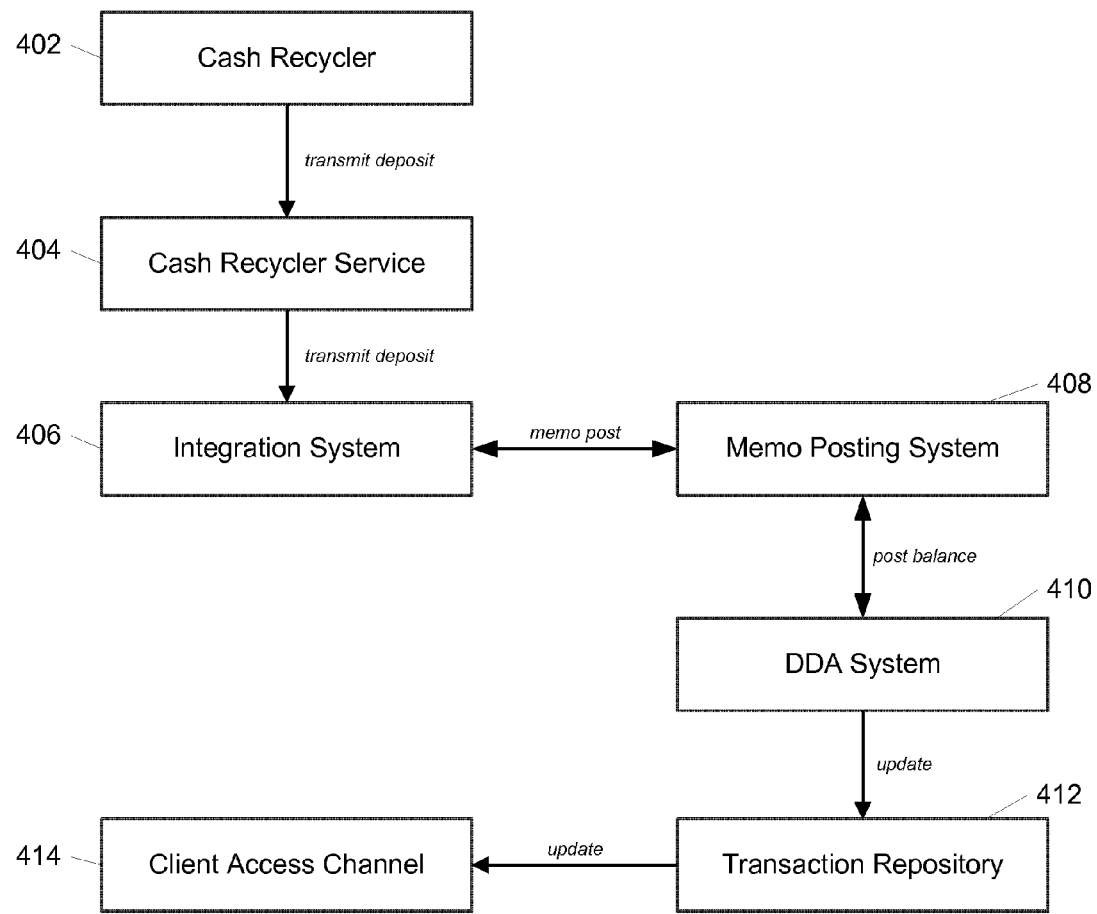
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers many advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, and U.S. application Ser. No. 12/241,385, entitled "Immediate Recognition of Financial Transactions," and filed on Sep. 30, 2008, the content of each being incorporated herein by reference in its entirety.

Figure 5:
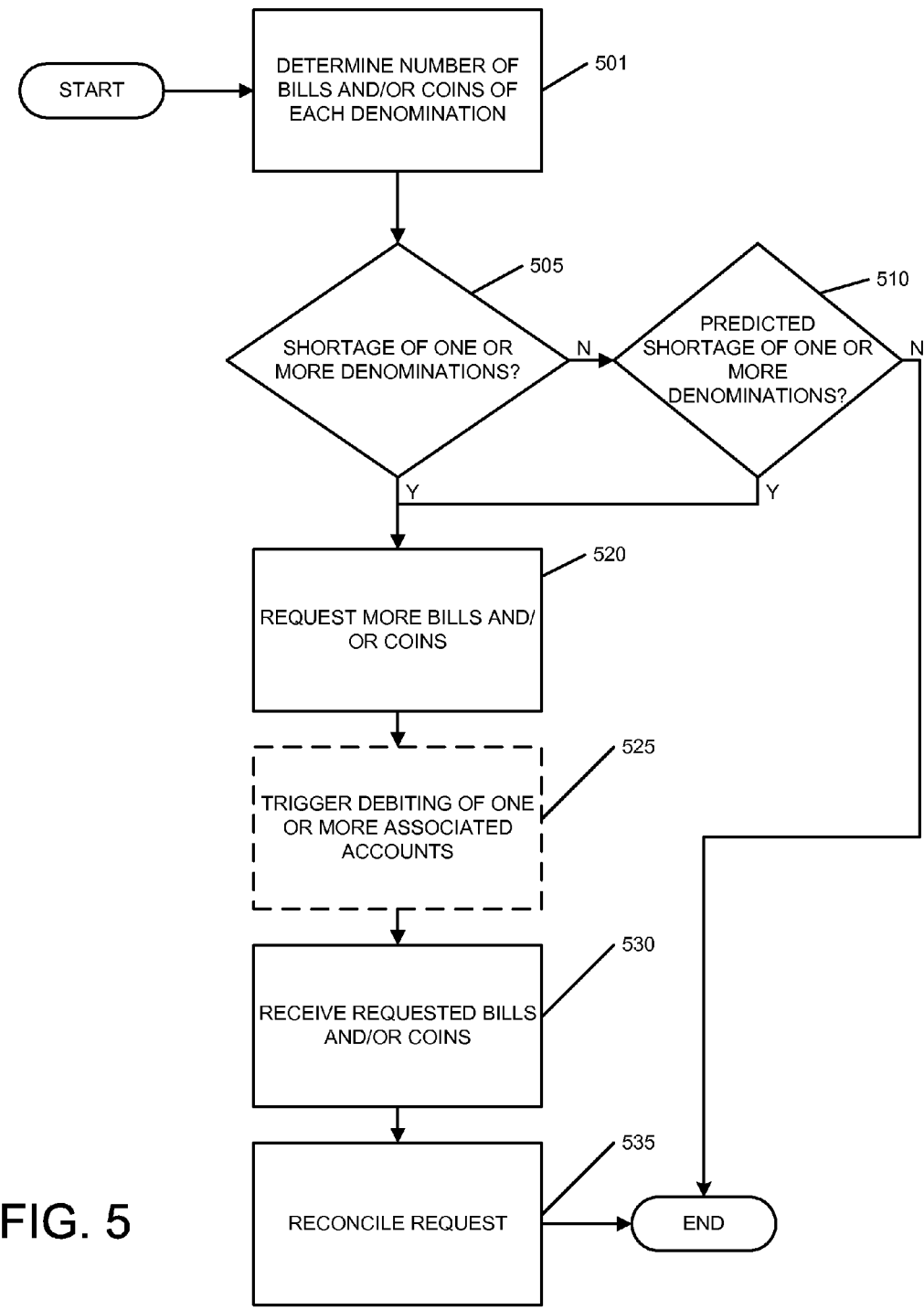
FIG. 5 illustrates a method of automatically generating a change order according to one or more aspects described herein.

FIG. 5 illustrates a method of automatically generating a change order according to one or more aspects described herein. Change orders generally refer to requests for funds and may include replenishment of funds, exchange of denominations and the like. In step 501, a cash recycler (e.g., recycler 200 of FIG. 2) may determine the number of bills or coins currently stored or available. The bills or coins may be of one or more denominations, and the cash recycler may be configured to differentiate between the bills or coins based on denomination. In one example, the cash recycler may determine the amount of currency available for each denomination by performing a counting operation on each of a plurality of stackers and cartridges in the cash recycler. Additional details relating to currency balancing or rebalancing are included in U.S. patent application Ser. No. 12/183,737, entitled "Transportation Withdrawal and Rebalance of Cash Handling Device" and filed on Jul. 31, 2008, and U.S. patent application Ser. No. 12/241,196, entitled "Transportation Withdrawal and Inventory Verification of Cash Handling Device" and filed on Sep. 30, 2008, the content of each being incorporated herein by reference in its entirety.

In step 505, a cash recycler may determine whether there is a shortage of bills and/or coins of one or more denominations. For example, after determining the number of bills and/or coins it has, a cash recycler may determine that there is currently a shortage of nickels and five-dollar bills based on a threshold level of nickels and five-dollar bills required at a particular time or during a particular period of time. In some instances, if a coin handling device is not available, levels of coins may be determined by manual reporting sources. A shortage may be defined in a variety of ways and may indicate that a denomination is empty or that an amount of a denomination is below a specified threshold. The threshold may be defined based on various factors such as an amount of currency needed for a full day of business or operations, an amount of currency used in the previous business day or week, and the like.

If, in step 505, a cash recycler 200 determines that there is not a current shortage of bills or coins, then the cash recycler may determine, in step 510, whether there is a predicted shortage of bills or coins of one or more denominations. For example, after determining the number of bills or coins the recycler currently holds, the recycler may determine that there is a predicted shortage of twenty-dollar bills based on a forecast of currency needs. The prediction or forecast may be made based on an analysis of historical usage data, user specified requirements, carrier schedules, sales, seasonal fluctuations, storage limitations and the like as discussed in further detail below. In one example, historical usage data may include a rate at which the quantity of bills and/or coins of each denomination changes. This rate may be a daily rate, weekly rate, annual rate, or the like. In another example, the historical usage data may include a plurality of rates, and each rate may be recalculated on a different time scale. Forecasting is described in further detail below.

In one or more configurations, the historical usage data may be collected and recorded by a cash recycler. Stated differently, in determining whether there is a predicted shortage of bills or coins of one or more denominations, the cash recycler 200 might only use the local, historical usage data it has collected and recorded itself. Additionally or alternatively, the historical usage data may be collected by multiple cash recyclers, and the historical usage data then may be completely or partially aggregated and compiled by or at a cash recycler, a back office computer, a bank computer, or a remote network computer. In at least this way, the cash recycler 200 may use aggregated and compiled historical usage data in determining whether there is a predicted shortage of bills and/or coins of one or more particular denominations. In one or more additional configurations, the multiple cash recyclers may be located in different physical locations and/or geographic regions, such that local and/or regional trends may be taken into account when making predictions. It may be desirable to account for local and/or regional trends in this way because, for example, the rate at which cash is typically withdrawn from one or more cash recyclers may be different in different locations.

If, in step 510, the recycler determines that there is not a predicted shortage of bills or coins of one or more denominations, then the process may end. For example, the operation of the cash recycler may continue normally without requesting additional funds.

If, in step 505, the recycler determines that there is a current shortage of bills or coins of one or more denominations, or if, in step 510, the cash recycler determines that there is a predicted shortage of bills and/or coins of one or more denominations, then in step 520, the cash recycler may automatically generate a request for more bills or coins from a financial institution in response. More specifically, in step 520, the cash recycler may automatically generate a change order and submit the change order to an associated financial institution for processing and fulfillment. For example, if a cash recycler determines that there is a predicted shortage of ten-dollar bills and that there is a currently a shortage of quarters and fifty-dollar bills, the cash recycler may automatically generate a change order to request additional quarters, ten-dollar bills, and fifty-dollar bills from an associated financial institution. In this way, a cash recycler may replenish its supply of bills and/or coins of one or more denominations.

In optional step 525, a cash recycler 200 may trigger debiting of one or more accounts at an associated financial institution. In one or more configurations, a cash recycler may cause one or more accounts at an associated financial institution to be debited for an amount that allows the change order to be processed. For example, a cash recycler may cause debiting of one or more accounts of an entity associated with the cash recycler 200 at the associated financial institution, and the amount caused to be debited may be the full amount of the change order or it may be a portion thereof. Alternatively, the debiting may be performed (e.g., by the financial institution) automatically in response to the change order request.

In step 530, a cash recycler 200 may receive bills or coins of one or more denominations in response to the automatically-generated change order. According to one or more aspects, the amount of currency requested in the automatically-generated change order may be delivered to the cash recycler by an agent or employee of the associated financial institution or a transport carrier service. Additionally or alternatively, the amount of currency requested in the automatically-generated change order may be picked up by the owner of the cash recycler, or by an agent or employee of the owner of the cash recycler. The amount of currency may or might not be debited from a client's account depending on various factors including credit risk, ownership and the like. Optionally, the currency handling device may receive an acknowledgment of the change order request (e.g., prior to step 530) indicating receipt and providing details such as a time of delivery, an amount being delivered, a carrier service identifier and the like.

In one or more configurations, the recycler may trigger debiting of one or more accounts at an associated financial institution (e.g., step 525) after the cash recycler 200 has received the requested bills and/or coins (e.g., step 530)

In step 535, a cash recycler 200 may reconcile the change order with the amount received. In one or more configurations, a cash recycler may reconcile a change order by comparing the amount of currency requested in the change order with the amount of currency received in response to the change order. For example, having received bills and/or coins of one or more particular denominations pursuant to an automatically-generated change order, a cash recycler may then reconcile the automatically-generated change order by comparing the amount of currency requested in step 520 to the amount of currency received in step 530. Additionally or alternatively, a cash recycler may reconcile the automatically-generated change order by comparing the amount of currency requested or was provided for transport by a financial institution in step 525 to the amount of currency received in step 530. Additionally or alternatively, a cash recycler may reconcile the automatically-generated change order by comparing the amount of currency requested in step 520 with the amount of currency which was actually provided by the financial institution in step 525. After reconciling the request for more bills and/or coins of one or more particular denominations in step 535, the process may end.

The method illustrated in FIG. 5 may be executed by or at a currency handling device, such as cash recycler 200 of FIG. 2. Additionally or alternatively, the method illustrated in FIG. 5 may be partially or completely executed by or at a currency handling device, a back office computer, a bank computer, and/or a remote network computer. For example, in one or more configurations, the method illustrated in FIG. 5 may be executed partially at a cash recycler and partially at a remote network computer. Still further, the methods described herein may be used to automatically generate change orders and reconcile funds at a point of sale system (as described in further detail below). For example, a point of sale system may include currency scales or other currency or coin amount determination mechanisms. Integrated currency scales in point of sale systems are discussed in detail in U.S. application Ser. No. 12/277,867, entitled "INTEGRATED CURRENCY SCALES," and filed on Nov. 25, 2008.

Figure 6:
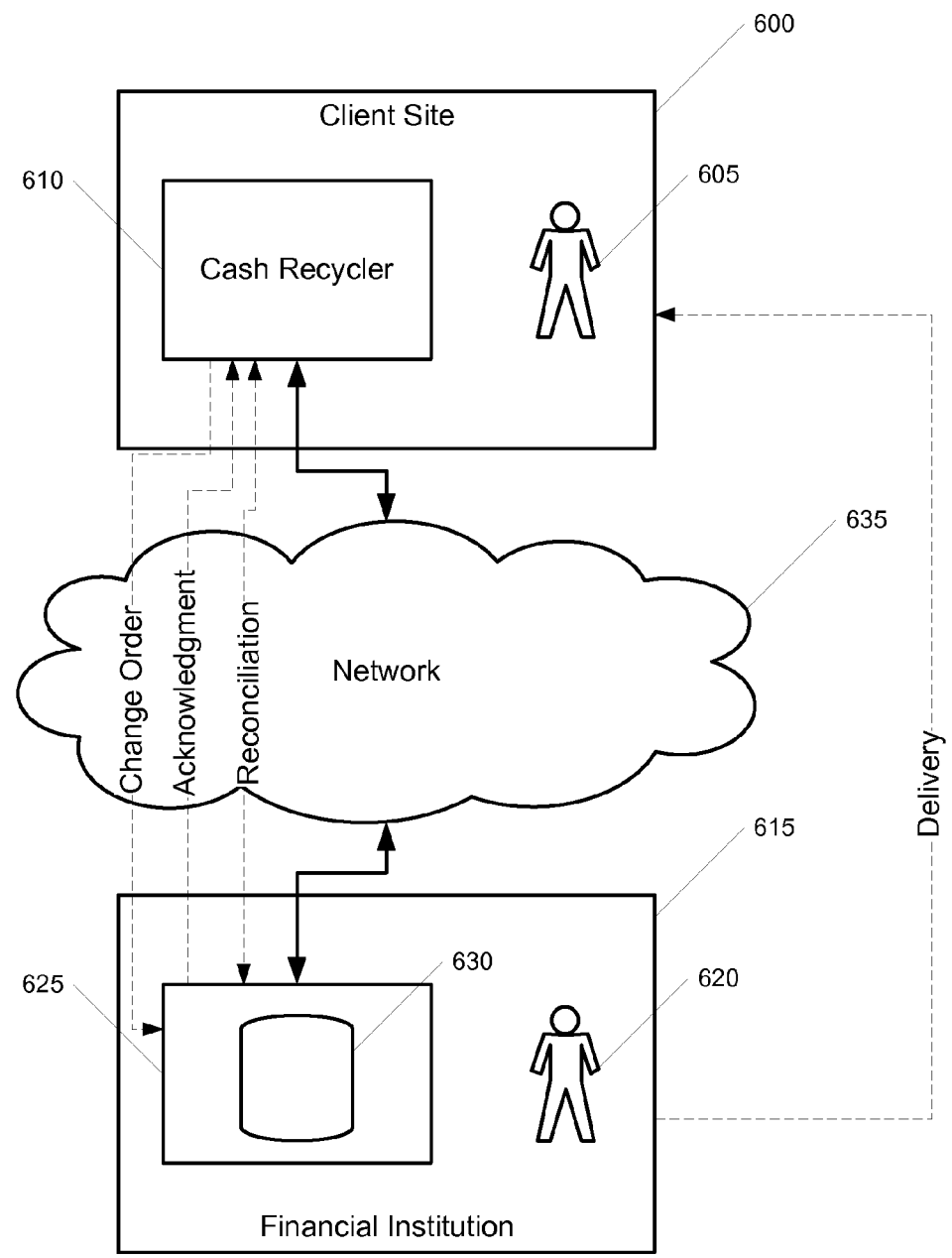
FIG. 6 illustrates an environment wherein the process of automatically generating a change order may be used according to one or more aspects described herein.

FIG. 6 illustrates an environment wherein the process of automatically generating a change order may be used according to one or more aspects described herein. For example, cash recycler 610 may be located in a client site, such as retail store 600. A user 605 may interact with cash recycler 610 in order to configure and/or conduct transactions at cash recycler 610. In addition, cash recycler 610 may communicate with various locations and/or remote devices, such as computers, via network 635.

In one or more configurations, a cash recycler 610 may be configured to communicate with a bank computer 625 across the network 635. Bank computer 625 may be located in a bank 615, and bank computer 625 may have database 630 stored therein. A bank employee 620 may interact with bank computer 625 in performing various functions, such as account management.

In some arrangements, the cash recycler 610 may communicate with the financial institution, such as the bank computer 625, via network 635 to determine whether there is currently a shortage of bills or coins of one or more denominations, as well as to determine whether there is a predicted shortage of bills or coins of one or more denominations. In addition, the cash recycler 610 may communicate with the bank computer 625 across the network 635 to automatically generate a change order and to submit the change order to an associated financial institution for processing and fulfillment. Further, the cash recycler 610 may communicate with the bank computer 625 across the network 635 to trigger debiting of one or more accounts at an associated financial institution or to receive bills and/or coins of one or more denominations pursuant to an automatically-generated change order. In still other arrangements, the cash recycler 610 may communicate with the bank computer 625 across the network 635 to reconcile a request for more bills or coins of one or more denominations.

Figure 7:
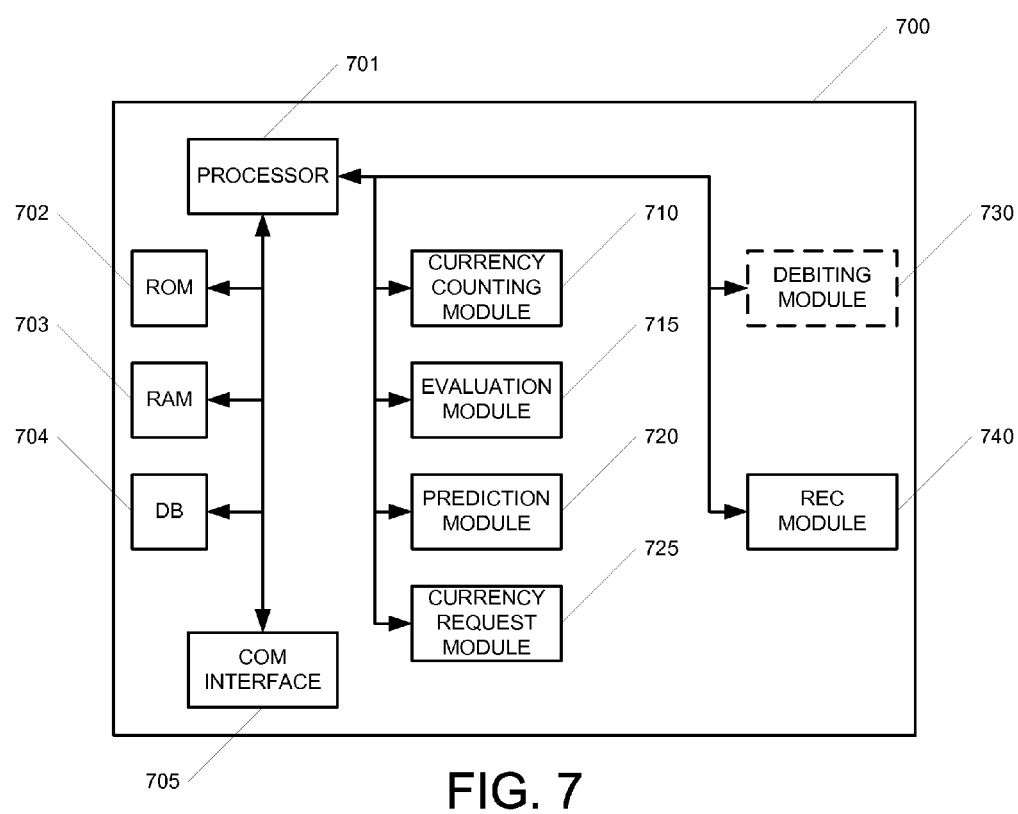
FIG. 7 illustrates an apparatus having various modules for automatically generating a change order according to one or more aspects described herein.

FIG. 7 illustrates an apparatus having various modules for automatically generating a change order according to one or more aspects described herein. Apparatus 700 may include a processor 701, memory such as ROM 702, RAM 703, database 704, and a communication interface 705, a currency counting module 710, an evaluation module 715, a prediction module 720, a currency request module 725, an optional debiting module 730, and a reconciliation module 740. Processor 701 may be configured to execute various instructions and perform calculations based on data received from modules 710, 715, 720, 725, 730, and 740. Currency counting module 710 may be configured to determine the number of bills and/or coins present in a quantity of currency, and may further be configured to differentiate between the bills and/or coins based on denomination. Evaluation module 715 may be configured to determine whether there is currently a shortage of bills and/or coins of one or more denominations. Prediction module 720 may be configured to determine whether there is a predicted shortage of bills and/or coins of one or more denominations. Currency request module 725 may be configured to request more bills and/or coins from an associated financial institution. More specifically, currency request module 725 may be configured to automatically generate a change order and submit the change order to an associated financial institution for processing and fulfillment. Debiting module 730 optionally may be included, and it may be configured to trigger debiting of one or more accounts at an associated financial institution. Reconciliation module 740 may be configured reconcile a request for bills and/or coins of one or more denominations. Stated differently, reconciliation module 740 may be configured to reconcile an automatically-generated change order.

Figure 8:
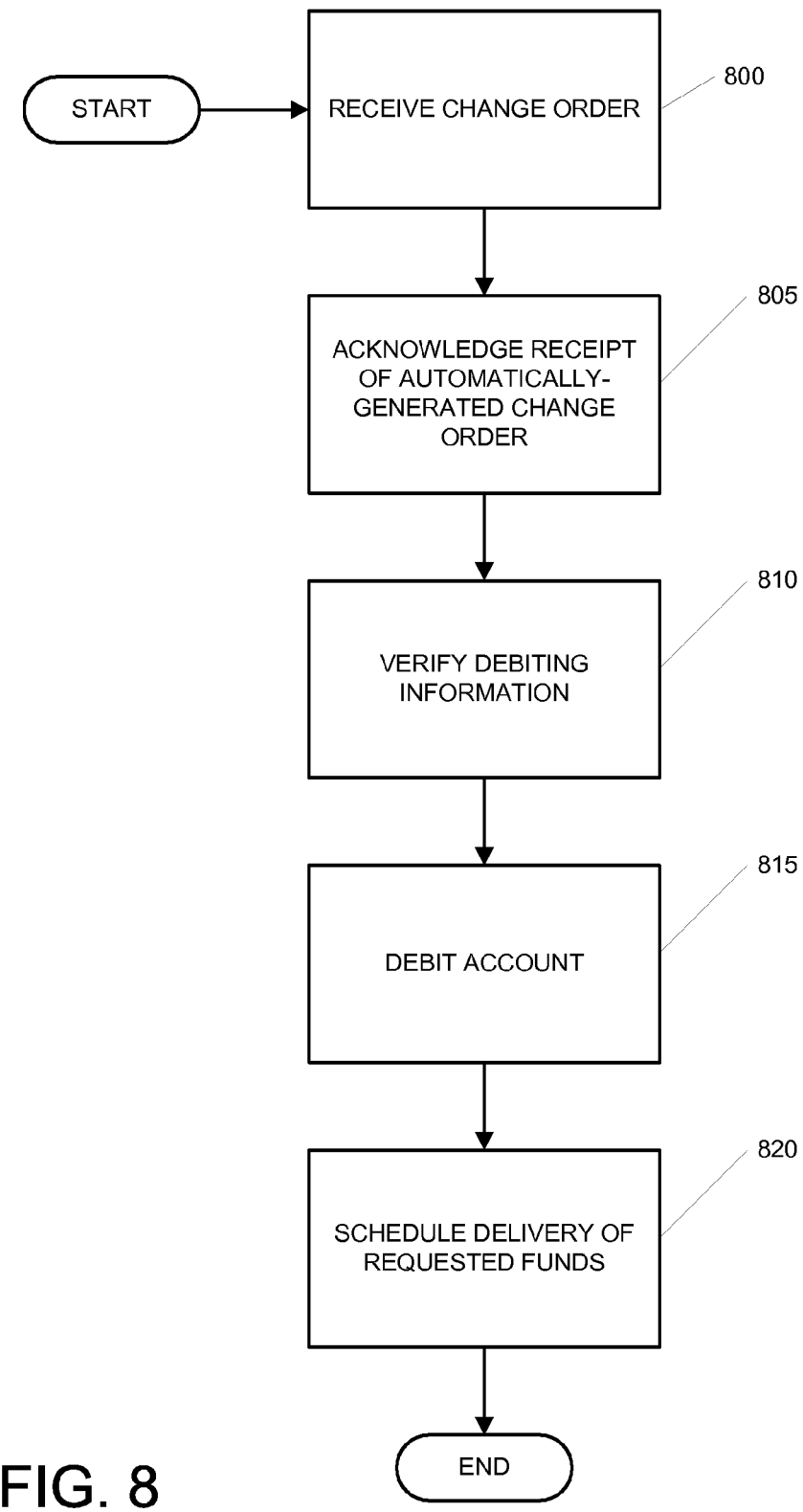
FIG. 8 is a flowchart illustrating a method of processing an automatically generated change order according to one or more aspects described herein.

FIG. 8 illustrates a method of processing an automatically generated change order according to one or more aspects described herein. In one example, a method of processing an automatically generated change order may be implemented at a bank by a bank computer, a bank employee, or a combination thereof.

In step 800, a bank computer 625 may receive a change order. In one example, an automatically generated change order may be received at a bank computer after being transmitted by a cash handling device.

In step 805, a bank computer 625 may acknowledge receipt of an automatically generated change order. For example, after receiving an automatically generated change order from a cash handling device, a bank computer may transmit a confirmation message to the cash handling device acknowledging receipt of the automatically generated change order. The confirmation message may contain information such as the amount of the change order, estimated delivery time, the account to be debited if debiting is to take place, and the like. In one or more configurations, the confirmation message may also contain a checksum for the data contained therein, and the checksum may allow the handling device to verify the integrity of the data contained in the confirmation message.

In step 810, a bank computer 625 may verify debiting information. In one example, after receiving an automatically generated change order from a cash handling device specifying that a particular account be debited, a bank computer may verify that the particular account to be debited has sufficient funds for the change order to be processed. This verification may be performed electronically by the bank computer or by a plurality of computers that provide access to account information.

In step 815, a bank computer 625 may debit an account. According to one or more aspects, a bank computer may communicate and exchange information with a database stored on the bank computer or on another computer in order to debit an account from which the amount of the change order may be withdrawn. Finally, in step 820, a bank computer 625 may schedule delivery of the funds requested in an automatically generated change order. In one or more configurations, bank computer 625 may automatically schedule delivery of the requested funds according to electronic scheduling information such as the availability of bank employees, the availability of a transport carrier service, and the like. After step 820, the method may end. For example, bank computer 625 may return to normal operation. Alternatively, an account might not be debited depending on a credit score or risk of the account holder. If an account holder's credit score is sufficiently high, for instance, a financial institution may feel secure in not debiting the account. Another consideration relating to whether an account is debited is the risk of an area or location.

Figure 9A:
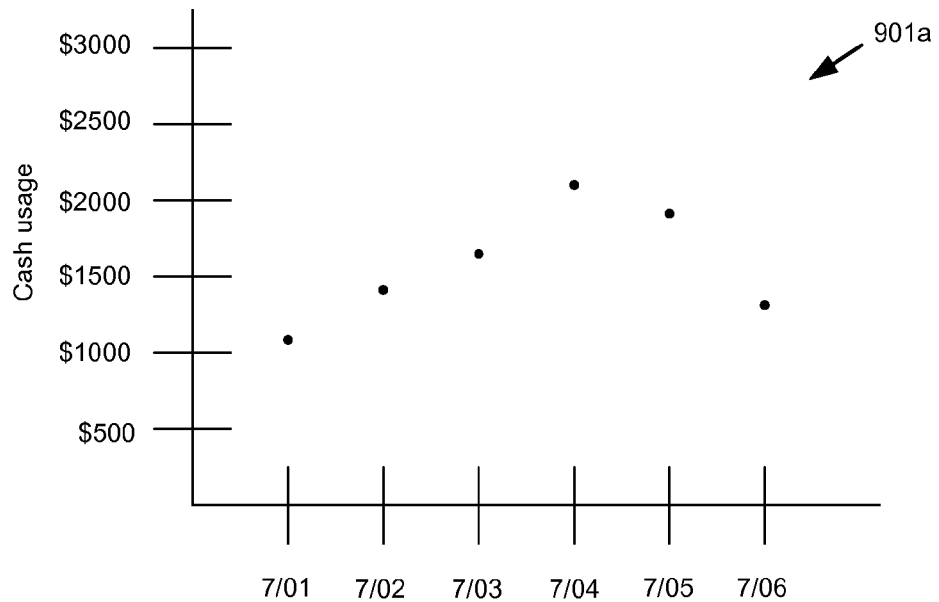
FIGS. 9A-C illustrate example cash usage trends on a weekly, monthly and quarterly basis.
Figure 9B:
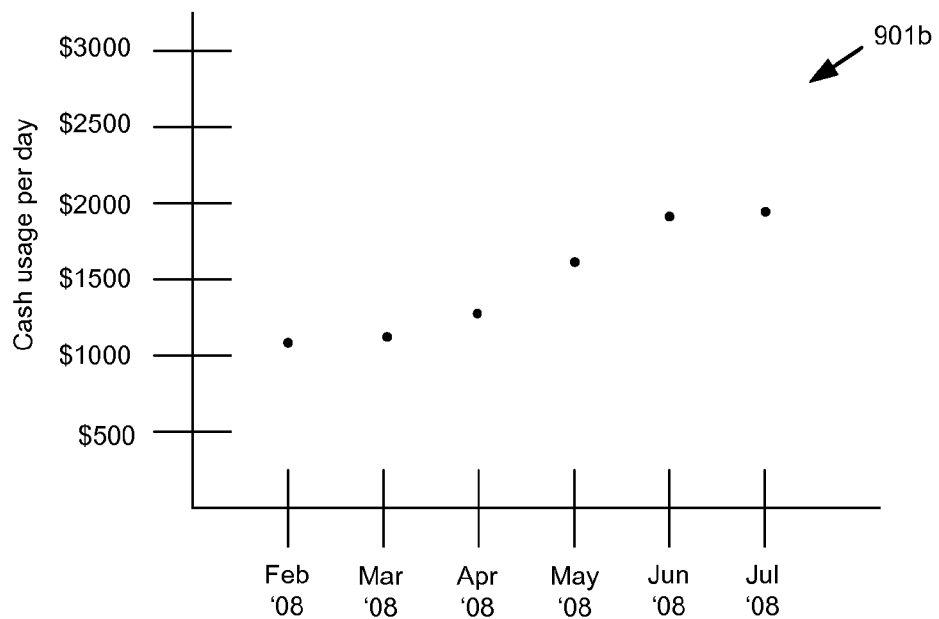
Figure 9C:
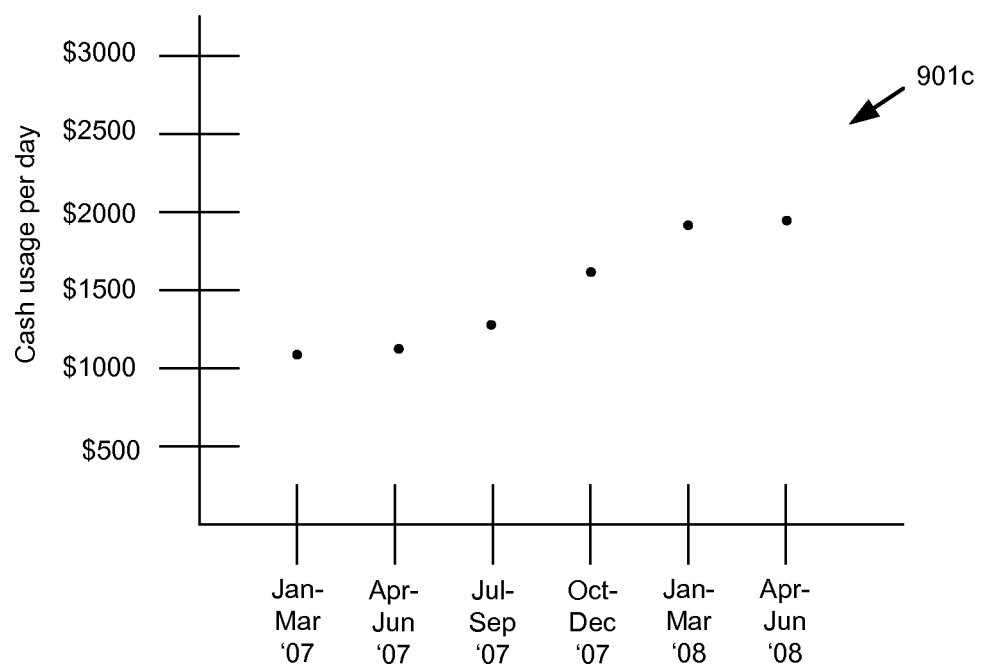

As described herein, forecasting and predictive modeling may be used in order to determine when a change order should be generated. Forecasting may be based on historical currency usage patterns evaluated for various time periods such as by day, by week, by bi-week, by month, by payroll period and the like. FIGS. 9A-C illustrate charts 901a, b and c displaying historical currency usage data on a daily basis, monthly basis and quarterly basis, respectively. In chart 901a of FIG. 9A, the currency usage data is graphed on a daily basis for the past 2 weeks. The currency usage data may further be broken down by denomination. Usage data may be either positive (indicating a net increase in bill count for a particular denomination for an operational period) or negative (indicating a net decrease in bill count for a particular denomination for an operational period). In chart 901b of FIG. 9B, the currency usage data is graphed monthly for the 6 past months. In chart 901c of FIG. 9C, currency usage data is shown for each quarter for the past year and a half. In addition to showing the levels of currency usage for the various periods, charts 901a, b and c provide indications of how usage levels change over time.

In one example, a recycler or other currency handling system may forecast currency needs for an upcoming week based on the currency usage for the same week in the previous year. In another example, a forecast of currency needs for the next month may be based on extrapolating a trend from the previous 3, 4, 5 or 6 months. Accordingly, if, in the past 3 months, currency needs have increased by $100 each month, the currency needs for the following month may be increased by $100 from the usage requirements of the current month. According to another aspect, usage or need modifiers may be used in order to compensate for events or conditions in which usages might not fall within a trend. As an example, currency usage needs will generally increase substantially during holiday seasons (e.g., Christmas, New Year's) or at the end of payroll periods in instances where employees are paid in cash. Modifiers may be calculated or otherwise determined, for example, by determining historical increases in usage between the holiday season (or other event) and a trend line. As an example, assume that in a previous year, the three months prior to December showed a steady increase in currency usage of approximately $500 per month but that December showed an increase in $1500 in currency usage. In the present year, a forecasting system may determine a cash usage for December by multiplying the average increase in September, October and November by 3 ($1500/$500). Other algorithms and methods may also be used.

According to another aspect, certain days or periods of the year might be specially designated as days or periods with additional currency needs. For example, holidays such as Christmas or Memorial Day or other high volume shopping days such as the day after Thanksgiving or regular sales event days may be marked in a system as days or series of days where a retail store may require additional funds beyond a typical usage of the remainder of the month. These additional funds may be expressed as a percentage increase in cash requirements by denomination.

Figure 10:
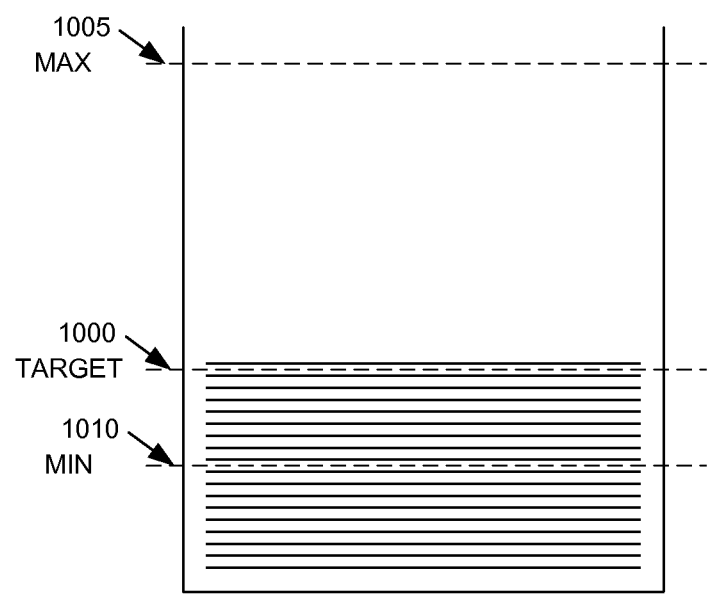
FIG. 10 illustrates minimum, maximum and target levels of currency for a cash storage device according to one or more aspects described herein.

Based on such forecasts and predictions of currency usage needs, a target level of currency may be determined and adjusted. FIG. 10 illustrates a currency storage bin with a target level 1000 delineated. The target level of currency generally corresponds to an ideal level of currency in a currency handling device such that there is not a significant shortage or overage of available funds on hand. Accordingly, based on the frequency of a forecast, the target levels may be adjusted hourly, daily, weekly, monthly and the like. For example, if a target level is set at $X for the week prior to Thanksgiving at a retail store currency handling device, the target level may be increased for the week following Thanksgiving to $Y to compensate for a forecasted increase in cash usage (e.g., due to increases in shopping activity). In addition to a target level, a minimum level 1010 and a maximum level 1005 may be defined. Minimum level 1010 may represent a level of currency below which, a shortage of funds will occur for a given period of time (e.g., a day, a week, a month). Maximum level 1005 may correspond to a level of currency over which an overflow of funds (e.g., base on physical storage capacity) will occur for a given period of time. Minimum and maximum levels 1010 and 1005, respectively, may be defined as percentages of the target level 1000 and/or may involve considerations of other factors such as a currency handling device's physical storage capacity.

Figure 11:
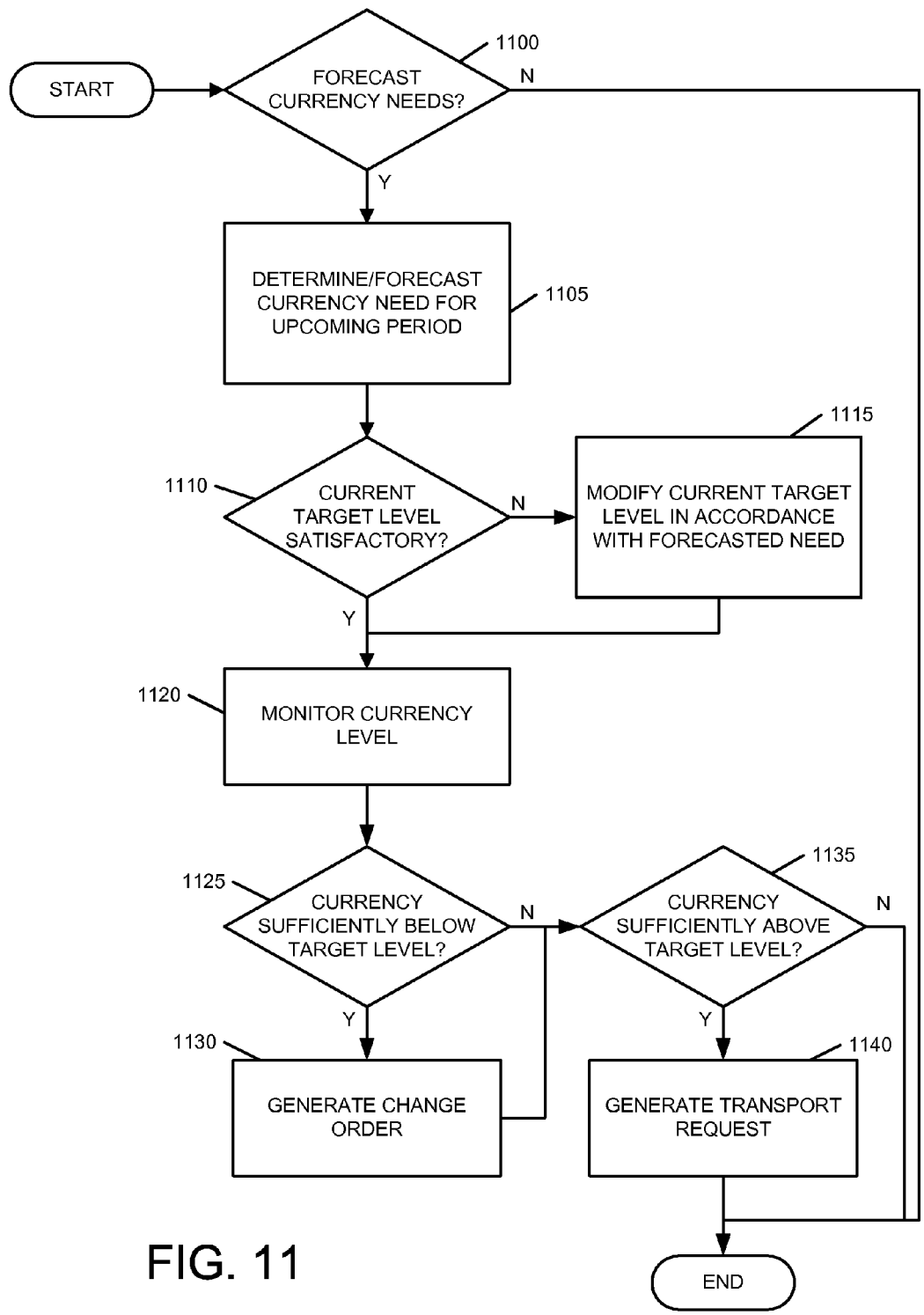
FIG. 11 is a flowchart illustrating a method for modifying a target level and generating change order and transport requests according to one or more aspects described herein.

FIG. 11 is a flowchart illustrating a method for forecasting cash usage needs and modifying target levels. In step 1100, for example, a forecasting system may determine whether to forecast currency usage needs for an upcoming period. Such a determination may be based on a predefined schedule or whether a usage need has previously been calculated for the upcoming period. For example, a predefined schedule may specify that usage needs for the next week are to be calculated on the Thursday of the current week. In another example, the system may calculate usage needs during low processing loads. If currency usage needs are to be determined, the system may forecast an expected currency requirement for the upcoming period of time in step 1105. As discussed, forecasts may be made using various methods including determining trend lines, extrapolating historical usage data, estimation based on usage levels at other stores and the like. In step 1110, the forecasting system may determine whether the current target level for the specified period of time corresponds to the forecasted usage need. If so, no changes may be made to the target level. If, however, the target level does not correspond to the forecasted usage need, the target level may be adjusted in step 1115. For example, if the forecast usage is greater than the current target level, the target level may be increased. Maximum and minimum levels may also be adjusted based on adjustments made to the target level. Target levels may be adjusted or fluctuate to a desired level of frequency.

Once the target level has been set for a currency handling device, the currency handling device may monitor the currency level to determine whether the current currency level is a specified amount below the target level (e.g., meeting or below a minimum level) in steps 1120 and 1125. If so, the currency handling device may automatically generate a change order in step 1130 to replenish the currency to the target level as described herein. Alternatively, if the current currency level is a specified amount above the target level (e.g., meeting or exceeding a maximum level) as determined in step 1135, the currency handling device may automatically generate a transport request to remove the currency down to the target level in step 1140.

In one or more arrangements, the recommended adjustment of target levels based on forecasted usage, automatic generation of change orders and/or generation of a transport request might only be executed upon confirmation from a user. In one example, the forecasting system or the currency handling system (or both if the same system) may prompt a user and/or a financial institution to accept or confirm the target level changes, generate the change order or generate the transport request. Additionally or alternatively, the system may allow a user or financial institution to modify the recommendations. Modifications may include making manual adjustments to the recommended target level, delaying a transport request and/or accelerating transmission of a change order request.

Figure 12A:
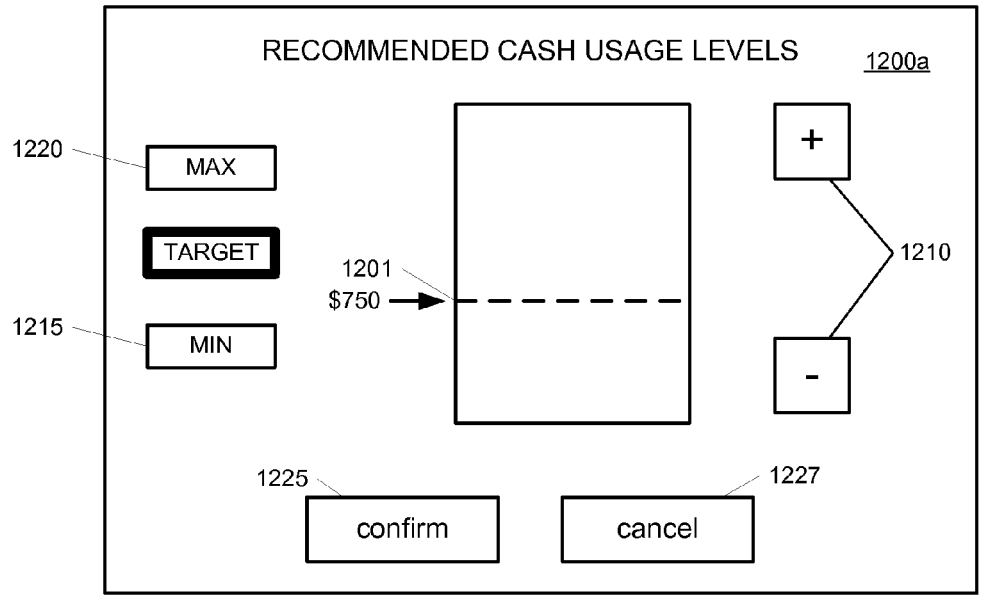
FIGS. 12A-C illustrate user interfaces for confirming target level changes, change orders and transport requests according to one or more aspects described herein.
Figure 12B:
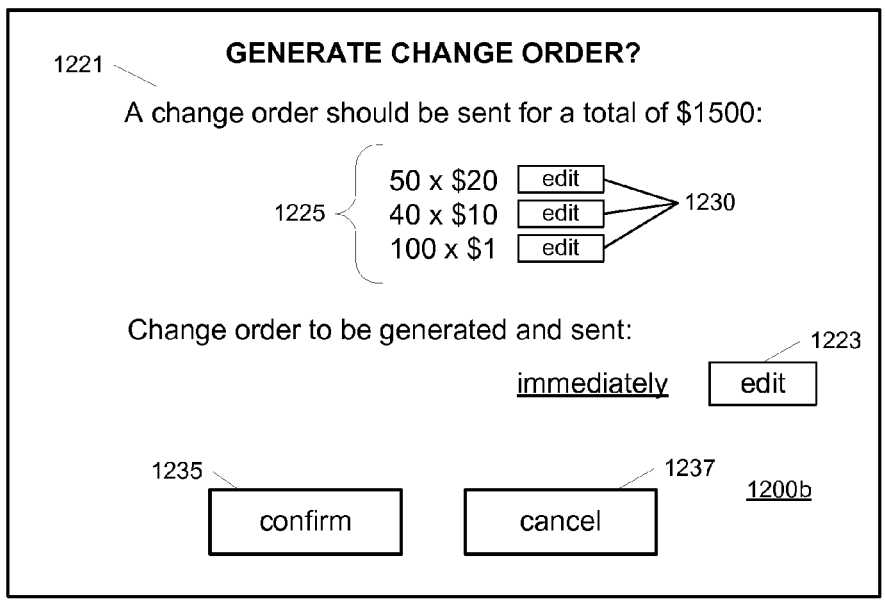
Figure 12C:
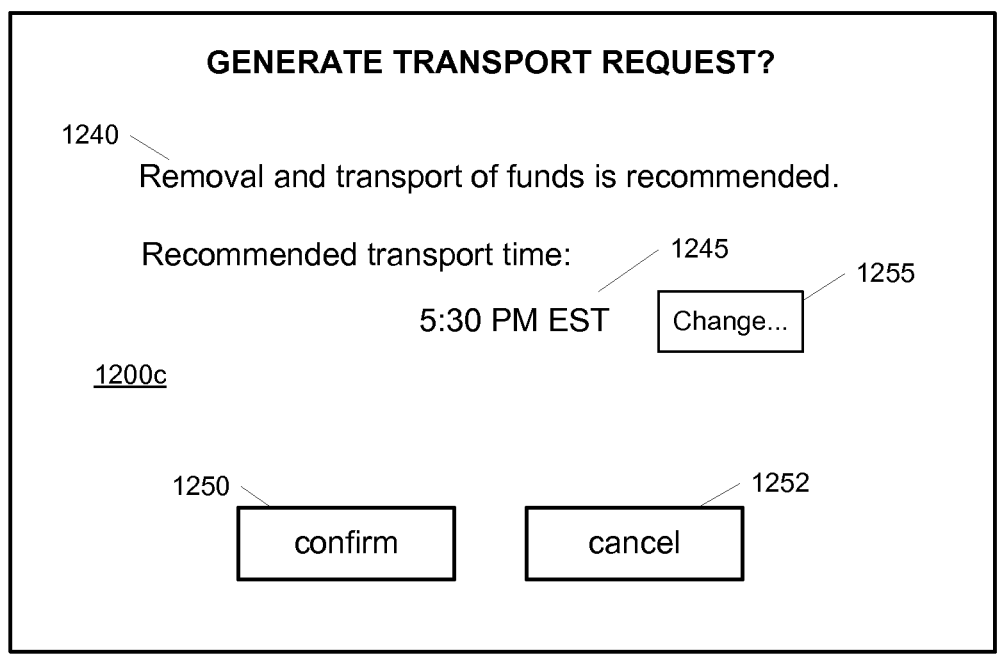

FIGS. 12A-C illustrate user interfaces for allowing a user to accept, reject or modify a recommended action. In FIG. 12A, for example, user interface 1200a displays a recommended target level 1201 to the user for confirmation 1225 or adjustment 1210. If the user believes the level is too high or too low, the '+' or '−' buttons 1210 may be used to move the target level. Adjustment buttons 1210 may also be used to modify minimum and maximum levels by selecting minimum level option 1215 or maximum level option 1220, respectively. Once the target level is set, the user may confirm the target level, maximum level and minimum level by selecting confirmation option 1225. A user may also reject changes by selecting a "Cancel" option 1227. In some instances, a user might be limited in the types of adjustments they may make. For example, the user might only be allowed to adjust a recommended or suggested target level or change order by a certain dollar amount (e.g., ±100 dollars) or a percentage (±5%).

In FIG. 12B, user interface 1200b may display a recommendation 1221 to generate and send a change order. Recommendation 1221 may include a breakdown 1225 of an amount of each denomination being requested. Each denomination amount may be separately modifiable using options 1230. Additionally, a user may choose to modify the time of the change order using edit option 1233. Thus, a user may request that the change order by delayed for 5 minutes, 30 minutes or an hour, for example. Once the change order is finalized, a confirmation option 1235 may be used to confirm the changes. Alternatively, a user may reject the change order recommendation using "Cancel" option 1237.

FIG. 12C illustrates user interface 1200c where a recommendation 1240 for a transport request is provided. The recommended transport time 1245 may be displayed and may be modified by a user using change option 1255. Once the transport request parameters are finalized, the request may be confirmed using confirmation option 1250. A transport request recommendation may also be rejected using "Cancel" option 1252.

Forecasting may be performed by a financial institution server, a currency handling device or another system. If the forecasting is performed by the financial institution or a system other than the currency handling device, the forecasted cash usage needs may be transmitted to the currency handling device for setting of the target level. In some instances, the financial institution or other system may instruct the currency handling device as to what the target level should be.

In current systems, when a change order is processed, the funds delivered to a client site are typically debited from the client's account during transport. For example, a client's account may be debited once the funds leave a vault at the financial institution and remain debited throughout transport to a client's currency handling system. According to one or more aspects, the present disclosure provides for fulfillment of a change order without debiting the transported funds from the client's account. Stated differently, credit for the amount of funds being transported to fulfill a change order is maintained in the client's account. Once the funds reach the client site, the received funds may be reconciled with the financial institution. In one or more configurations, a financial institution may use an internal general ledger to track funds. That is, rather than debiting a client's account, the financial institution may debit the institution's own general ledger account to account for the funds in transit. The funds may subsequently be deposited into the general ledger account once receipt of the funds is confirmed by the receiving client.

Figure 13:
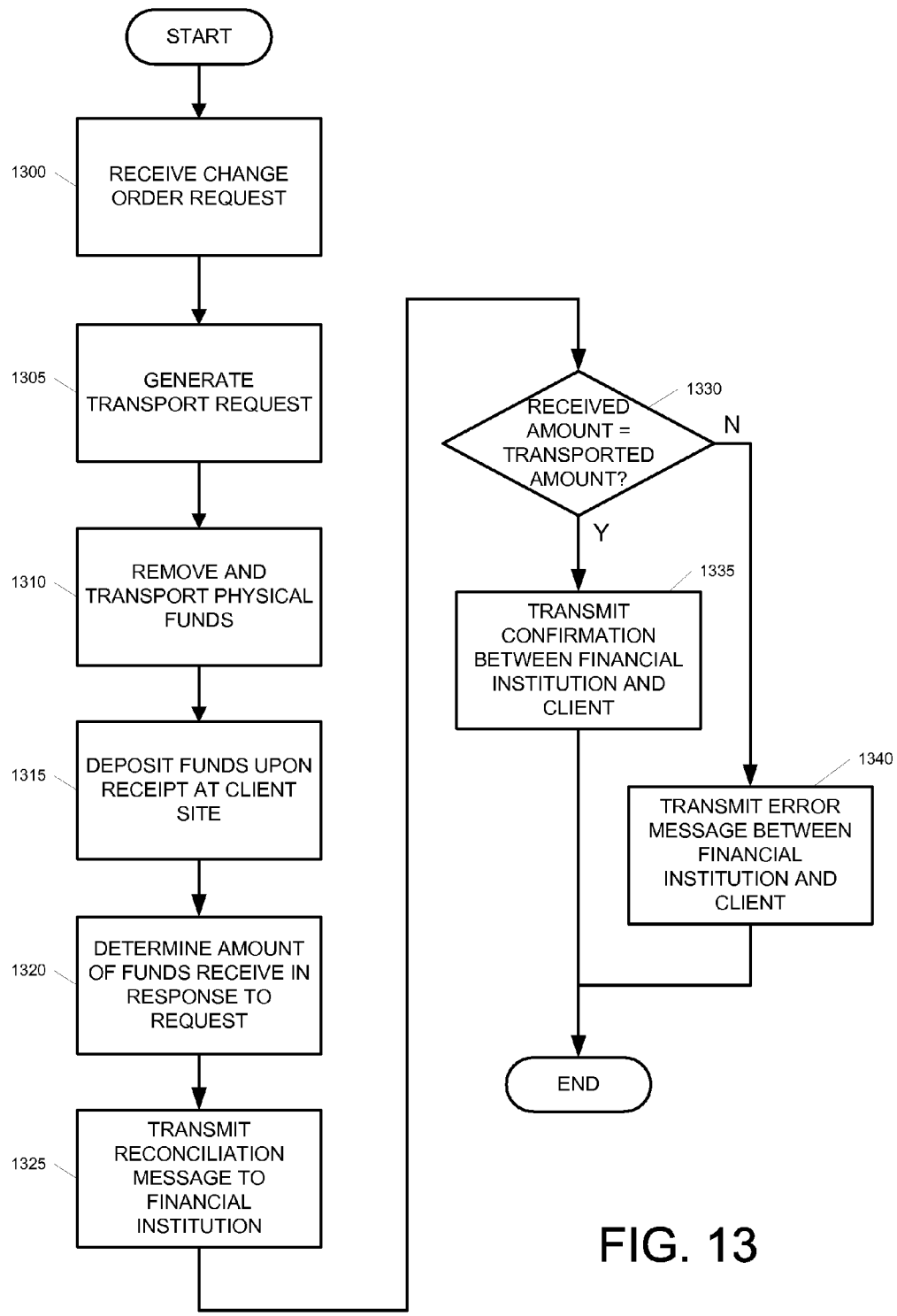
FIG. 13 is a flowchart illustrating a method for processing a change order request according to one or more aspects described herein.

FIG. 13 illustrates a method for fulfilling a change order without debiting a client's account. In step 1300, a financial institution may receive a change order request from a client. The request may be received from a currency handling device of the client, for example. The financial institution may then generate and send a transport request to have the requested amount of funds transported to the client in step 1305. In one or more configurations, the transport request may be sent to a transport company or organization that provides secure transport of currency from one location to another. The requested amount of funds may then be physically removed from the financial institution in step 1310 and transported to the client. As discussed, during transport to the client, the funds are not debited from the client's account.

Once the funds reach the client site, the funds may be deposited into a currency handling device in step 1315. During or after the deposit, the currency handling device may determine an amount of funds received in response to the change order request in step 1320. The currency handling device may count the funds as the funds are inserted or conduct a count once the funds have been inserted into the device. The currency handling device may then transmit a reconciliation message to the financial institution indicating the amount of funds received in step 1325. In step 1330, either the financial institution or the currency handling device may determine whether the received amount matches the amount transported. If so, a confirmation message may be transmitted between the financial institution and the currency handling device in step 1335. If, however, there is a discrepancy in the funds received and funds transported, an error message may be sent in step 1340. Additionally or alternatively, an account may be deducted for the difference in the amounts depending on who bears the risk. For example, if the client bears the risk, the discrepancy may be deducted from the client's account. However, if the financial institution bears the risk, the financial institution may take a loss. A problem ticket might also be opened to identify a cause for the discrepancy.

Whether funds are debited from a client's account may be determined by evaluating a credit risk. That is, a financial institution may determine whether the client's credit history is sufficiently sound to not debit the change order amount from client's account during transit.

While the automatic generation of change orders, forecasting and change order/transport advice has largely been described as occurring between a cash recycler and a financial institution, the same or similar aspects may be used in a point of sale system such as a payment kiosk or a cash register. In one example, a change order generated by a point of sale system may be transmitted to a back office system such as an in-store cash recycler (a local change order) or may be transmitted to the financial institution (a remote change order).

Figure 14:
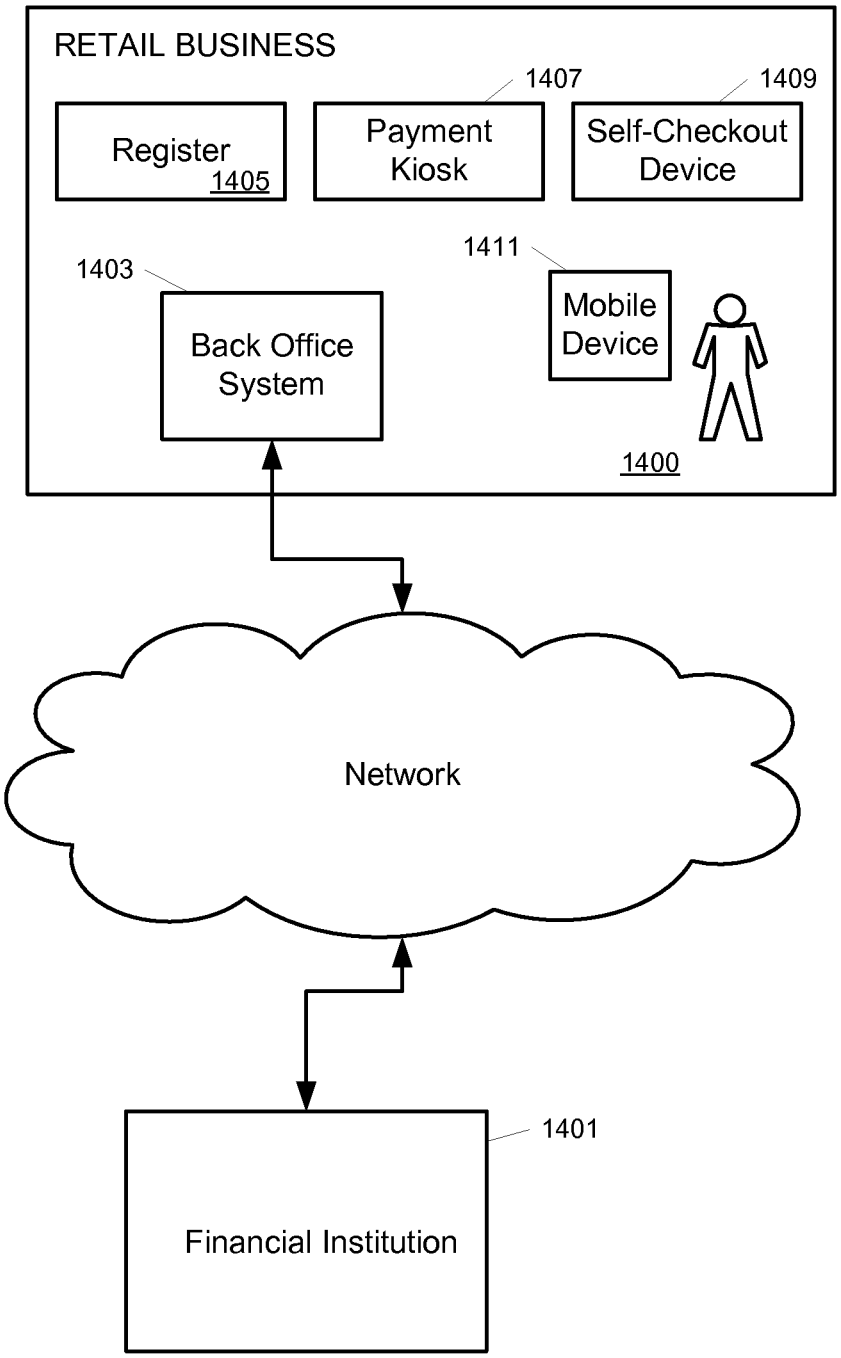
FIG. 14 is a diagram of a network environment in which a point of sale system or other cash handling devices may generate change orders according to one or more aspects described herein.

FIG. 14 illustrates a network environment wherein communications between financial institution 1401, back office system 1403, register 1405, payment kiosk 1407 and self-checkout device 1409 may be facilitated. Back office system 1403, register 1405, payment kiosk 1407 and self-checkout device 1409 may all be located at the same location such as retail store or business 1400. Financial institution 1401 may hold a financial account of the retail store or business and be situated remotely from the retail store or business and systems and devices 1403, 1405, 1407 and 1409. Communication between each of devices 1405, 1407 and 1409 may, in one or more arrangements, be facilitated by back office system 1403. That is, communications and other transmissions from devices 1405, 1407 and 1409 may initially pass through back office system 1403 prior to reaching financial institution 1401. Back office system 1403 may thus filter communications if necessary. Similarly, communications to devices 1405, 1407 and 1409 may be initially received by back office system 1403 and processed if needed.

In the illustrated arrangement of FIG. 14, any of devices 1405, 1407 and 1409 may automatically generate a change order if one or more denominations of currency or coin are below a certain threshold or a transport request if denominations are exceeding another threshold. The change order may be a local change order directed to the back office system 1403 or a remote change order directed to the financial institution 1401. Thus, additional or replacement funds may be delivered locally to a requesting device (e.g., one of devices 1405, 1407 or 1409) from a back office system 1403 such as a cash recycler or the like without contacting the financial institution 1401. Alternatively, change orders may be sent to and replenishment funds may be received from financial institution 1401. Optionally, back office system 1403 may aggregate change order requests from devices 1405, 1407 and 1409 and transmit the requests as a single request at specified times.

As noted, change order requests from devices 1405, 1407 and 1409 may be transmitted to back office system 1403 and/or financial institution 1401. In addition or alternatively, a notification that a change order request has been received may be sent wirelessly to a mobile device such as cell phone 1411 of a manager or other personnel authorized to approve and process change order requests. Other mobile devices may include laptop computers, beepers, PDAs and the like. Change order notifications may also be sent through wired network connections to other devices such as a manager's computer.

Figure 15:
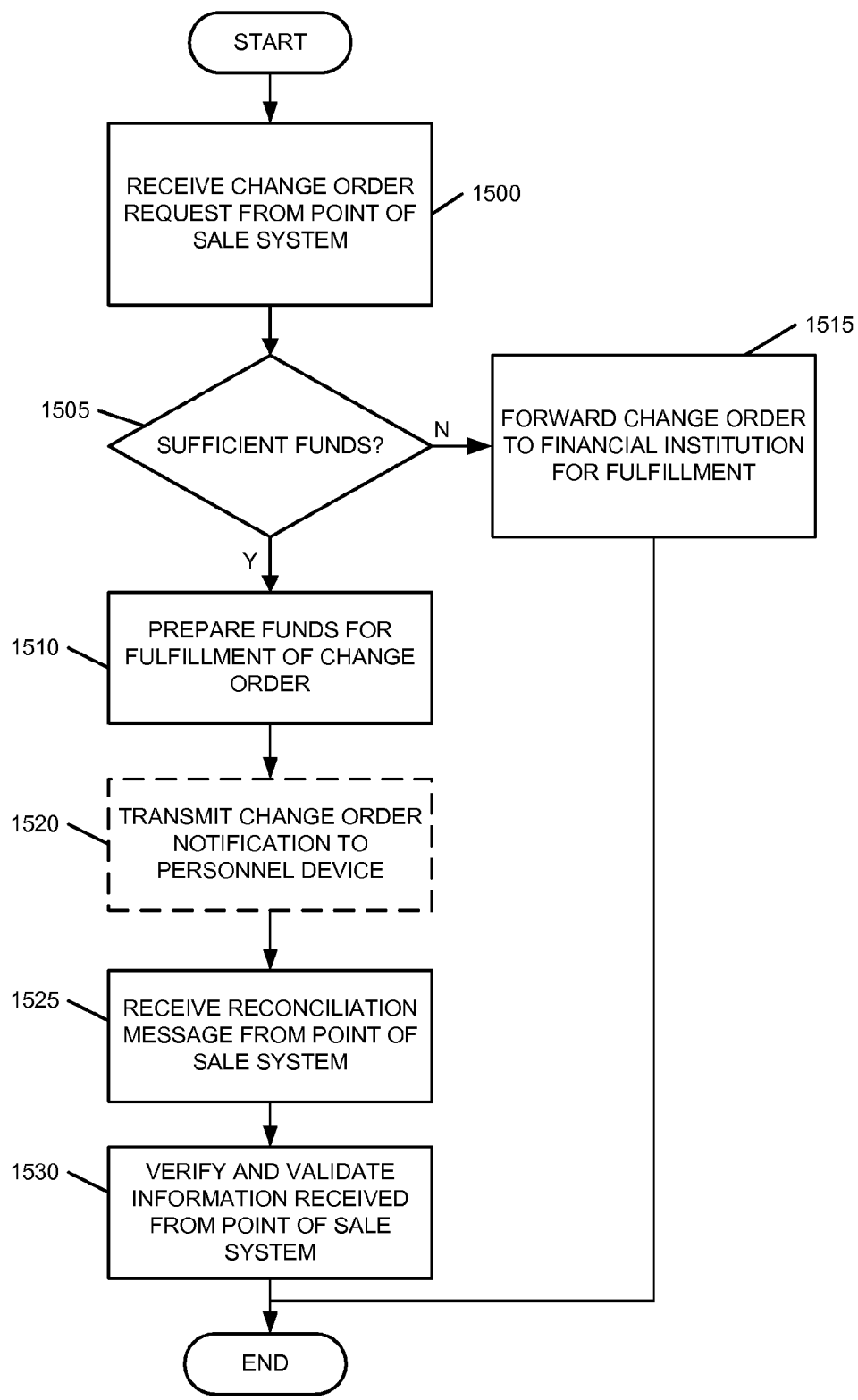
FIG. 15 illustrates an example method of processing a change order request at a back office system according to one or more aspects described herein.

FIG. 15 illustrates a method for processing automated change orders from a point of sale system at a back office system. In step 1500, the back office system may receive a change order request from a point of sale system. The back office system may then determine whether the system has sufficient funds to fulfill the change order in step 1505. If the system has sufficient funds, the back office system may prepare the funds for transport to the requesting point of sale system in step 1510. If, on the other hand, the back office system does not have sufficient funds to fulfill the change order, the back office system may forward the change order request to a financial institution instead in step 1515. Whether a change order request is fulfilled by the back office system or by a financial institution may be determined based on other factors. For example, a change order request above a certain amount might always need to be sent to a financial institution for processing and fulfillment. In another example, a change order request during certain times of the day or days or periods of the year may be subject to requirements that those requests be processed by the financial institution.

Optionally, in step 1520, the back office system may transmit a change order notification to a manager or personnel in charge of processing change order requests. Thus, a change order might not be processed or fulfilled until the manager or other personnel provides approval. For example, at the manager's option, the approval may take place at the back office system or remotely via a mobile device. Once approved, the change order information may be placed in a "pending delivery to POS" queue. A cashier may then login to the back office system and select the change order from the queue, at which point the appropriate funds would be dispensed and debited to the cashier's drawer. Automatic dispensation of funds into a drawer is described in U.S. application Ser. No. 12/277,890, entitled "SYSTEM AND METHOD OF RECONCILING CURRENCY AND COIN IN A CASH HANDLING DEVICE," and filed on Nov. 25, 2008, now U.S. Pat. No. 8,141,772, issued Mar. 27, 2012, the content of which is incorporate herein by reference in its entirety.

Alternatively, the change order may be directed to a manager's queue, which may contain pending change orders for multiple cashiers and/or cash registers. At the manager's option, all change orders may be dispensed sequentially with individual receipts, or change orders may be selected and dispensed individually. In either case, the manager or another employee of similar authority may perform the transaction on behalf of the cashier or register and cashier/register balance would be debited appropriately.

Once a change order request has been fulfilled and the point of sale system is in receipt of the requested funds, the back office system may receive a reconciliation message from the point of sale system in step 1525. The reconciliation may also be sent to a manager's mobile device. The reconciliation message may include an indication of an amount that was received, an amount that was requested, a time of receipt, a transport entity identifier and/or combinations thereof. In step 1530, the information may be verified and validated to insure that no errors were made in fulfilling the change order request (e.g., the correct amount was received and from the proper transport carrier). In one arrangement, the verification and validation may be carried out by the back office system. In another arrangement, the back office system may forward the information to a financial institution for verification and validation. Whether the verification is performed by the back office system or the financial institution may depend on which entity fulfilled the change order request.

By allowing change orders to be generated by a point of sale system, efficiency may be increased in a business. For example, employees would no longer need to find a manager, bring the till to the manager and wait for the manager to provide the requested funds. Instead, an automated change order request may be issued when a denomination level is approaching a specified threshold. The funds may then be prepared for or delivered to the employee without having the employee to leave their stations mid-shift and potentially slow down checkout of customers. Additionally, by forecasting and generating change orders prior to a denomination shortage, point of sale systems may be operational for longer periods of time without disruption.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

We claim:

1. A method comprising:
   receiving, by a back office system, a change order request from a point of sale system, wherein the change order request includes a request to exchange an amount of currency of a first denomination stored at the point of sale system with an amount of currency of a second denomination, wherein the amount of the currency of the second denomination is not stored at the point of sale system;
   determining, by the back office system, whether the back office system is able to fulfill the change order request including determining whether the amount of the currency of the second denomination is stored at the back office system;
   in response to determining that the back office system is able to fulfill the change order request, preparing funds for delivery to the point of sale system in accordance with the change order request without requesting funds from a remotely located financial institution holding an account of an entity associated with the back office system, wherein the funds include the amount of the currency of the second denomination; and
   in response to determining that the back office system is unable to fulfill the change order request, electronically forwarding, by the back office system, the change order request to the financial institution,
   wherein the point of sale system and the back office system are located in a retail location different from a location of the financial institution, and
   wherein preparing the funds for delivery includes transmitting a notification to a mobile device configured to be used by a manager of the retail location, the notification requesting approval of the change order request prior to the funds being dispensed by the back office system.

2. The method of claim 1, wherein the change order request is forwarded to the financial institution as part of a group of change order requests.

3. The method of claim 1, wherein the change order request is received through a data network connection.

4. The method of claim 1, wherein a value of the amount of currency of the second denomination is at least equal to the value of the amount of currency of the first denomination.

5. The method of claim 1, wherein determining whether the back office system is able to fulfill the change order request further includes determining that the back office system is unable to fulfill the change order request based on the change order request exceeding a predetermined amount that requires processing and fulfillment by the financial institution.

6. The method of claim 1, wherein determining whether the back office system is able to fulfill the change order request further includes determining that the back office system is unable to fulfill the change order request based on a current time of day, a current day, or a current period of year.

7. The method of claim 1, further comprising:
   receiving, by the back office system, a reconciliation message from the point of sale system; and
   sending, by the back office system, the reconciliation message to the mobile device configured to be used by the manager of the retail location.

8. An apparatus comprising:
   a processor; and
   memory operatively coupled to the processor and storing computer readable instructions that, when executed, cause the apparatus to:
      receive, at a back office system, a change order request from a point of sale system, wherein the change order request includes a request to exchange an amount of currency of a first denomination stored at the point of sale system with an amount of currency of a second denomination, wherein the amount of the currency of the second denomination is not stored at the point of sale system;
      determine whether the back office system is able to fulfill change order request by determining whether the amount of the currency of the second denomination is stored at the back office system;
      in response to determining that the back office system is able to fulfill the change order request, prepare funds for delivery to the point of sale system in accordance with the change order request without requesting funds from a remotely located financial institution holding an account of an entity associated with the back office system, wherein the funds include the amount of the currency of the second denomination; and in response to determining that the back office system is unable to fulfill the change order request, electronically transmit the change order request to the financial institution, wherein the point of sale system and the back office system are located in a retail location different from a location of the financial institution, and wherein preparing the funds for delivery includes transmitting a notification to a mobile device configured to be used by a manager of the retail location, the notification requesting approval of the change order request prior to the funds being dispensed by the back office system.

9. The apparatus of claim 8, wherein the change order request is forwarded to the financial institution as part of a group of change order requests.

10. One or more non-transitory computer readable media storing computer readable instructions that, when executed, cause an apparatus to:

receive, at a back office system, a change order request from a point of sale system, wherein the change order request includes a request to exchange an amount of currency of a first denomination stored at the point of sale system with an amount of currency of a second denomination, wherein the amount of the currency of the second denomination is not stored at the point of sale system;

determine whether the back office system is able to fulfill change order request by determining whether the amount of the currency of the second denomination is stored at the back office system;

in response to determining that the back office system is able to fulfill the change order request, prepare funds for delivery to the point of sale system in accordance with the change order request without requesting funds from a remotely located financial institution holding an account of an entity associated with the back office system, wherein the funds include the amount of the currency of the second denomination; and in response to determining that the back office system is unable to fulfill the change order request, electronically transmit the change order request to the financial institution, wherein the point of sale system and the back office system are located in a retail location different from a location of the financial institution, and wherein preparing the funds for delivery includes transmitting a notification to a mobile device configured to be used by a manager of the retail location, the notification requesting approval of the change order request prior to the funds being dispensed by the back office system.

11. The one or more non-transitory computer readable media of claim 10, wherein a value of the amount of currency of the second denomination is at least equal to the value of the amount of currency of the first denomination.

12. The one or more non-transitory computer readable media of claim 10, wherein the computer readable instructions, when executed, further cause the apparatus to:

receive, by the back office system, a reconciliation message from the point of sale system upon the point of sale system receiving the amount of the currency of the second denomination; and verify, by the back office system, that the amount of the currency of the second denomination received matches the amount of the currency of the second denomination requested.

* * * * *